May 28, 1929.　　A. W. NORDGREN　　1,715,042
BUMPER FITTING
Filed Aug. 6, 1928
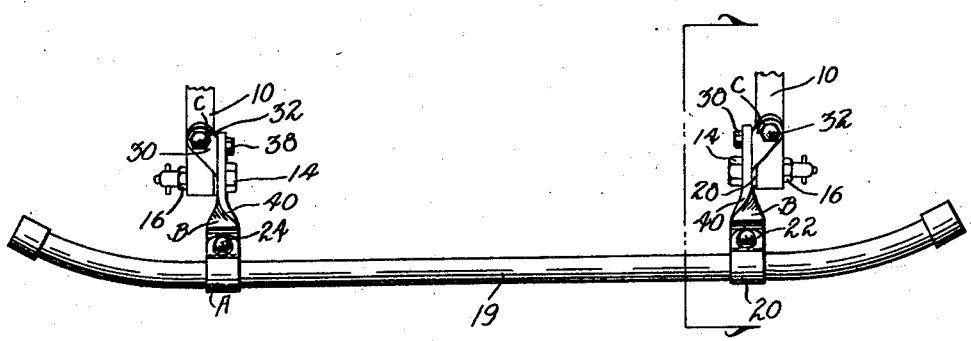
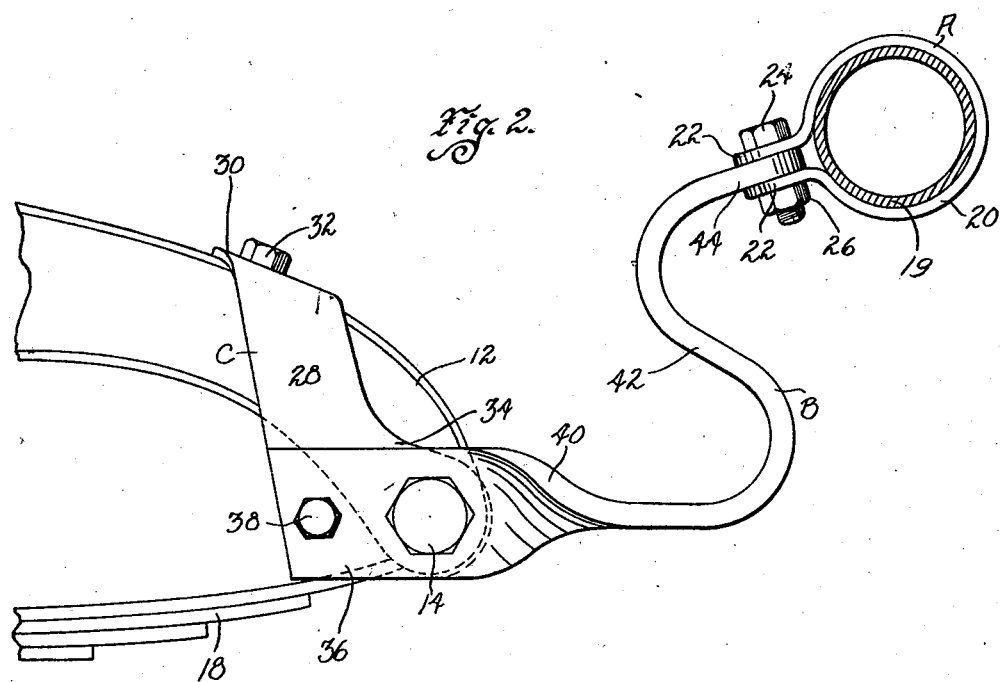

Patented May 28, 1929.

1,715,042

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER FITTING.

Application filed August 6, 1928. Serial No. 297,743.

My invention has to do with a bumper fitting adapted for the convenient mounting of bumpers on cars of different makes.

The object of this invention is to provide a bumper fitting of simple and inexpensive construction which has a supporting bracket adapted to be mounted on an automobile frame and which involves a simple and convenient means for adjustably connecting the support with a bumper at different points in the length thereof by clamping to the bumper and also to the support.

A further object of the invention is to provide a structure of the character described in which the fitting includes a vertically arranged S-curve possessing an inherent resiliency for the cushioning of shocks.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view showing the forward ends of automobile frame members with a pair of my improved bumper fittings mounted thereon and supporting a bumper at the forward end of the vehicle.

Figure 2 is a side elevation partly in section on the line 2—2 of Figure 1.

Most of the automobiles now on the market have longitudinal channel bar frame members, such as are shown in part in the accompanying drawings and indicated by the reference numeral 10. These channel frame members ordinarily open inwardly toward the median line of the vehicle and many of them have at their forward ends, the downturned horns 12. At the extremities of the horns 12 are bolts 14 having nuts 16 thereon for the support of the forward end of vehicle springs 18.

My improved bumper fittings are employed in pairs, one for each of the spaced vehicle frame members 10 and are utilized to support a tubular bumper such as 19.

Each of the fittings involves three parts, namely a clamp member A, a supporting arm B and a bracket C. Each clamp consists of a resilient split ring or band 20 having at its ends, rearwardly projecting spaced parallel apertured ears 22. The split ring or band 20 is adapted to encircle the tubular bumper 19 near one end thereof and the spaced apertured ears 22 are arranged to receive a clamping bolt 24 having a nut 26 thereon.

Each bracket C includes a strap or bar 28 arranged in substantially vertical position against the inner face of a frame member 10 adjacent the horn portion 12 thereof.

Each strap or bar 28 has at its upper end, an integral outwardly extending substantially horizontal portion 30 which overlies a potion of a frame member 10 and is apertured to receive a bolt 32 by means of which the bracket is rigidly secured to the frame member. At its lower end each strap or bar 28 is formed with a forwardly extending portion 34 which is apertured to receive the spring bolt 14.

Each supporting member B includes at its rear end, a strap portion 36 which is arranged in a vertical plane in contact with the lower enlarged portion 34 of one of the brackets C and is apertured to receive the spring bolt 14. The strap portion 36 extends rearwardly to the rear margin of the bracket C and both of said members are apertured to receive a connecting bolt 38, which bolt together with the spring bolt 14, serves to hold the bracket and supporting member rigidly together.

Just forwardly of the horn 12 of the vehicle frame, the strap portion 36 of each supporting member is twisted a quarter turn at 40 to bring the strap into a substantially horizontal plane and from said twisted portion the supporting member continues forwardly and upwardly in the form of an S-curve 42, which terminates in a straight portion 44.

The straight portion 44 of each supporting member B preferably is directed slightly upwardly of a horizontal plane and is received within the spaced apertured ears 22 of a clamping member A and is apertured to receive the clamping bolt 24.

By this means, the bumper 19 is securely, yet resiliently supported at the front of the vehicle frame, the vertical S-curves 42 of the supporting members having sufficient inherent resiliency to partially absorb and cushion shocks which may result from the impact of the bumper element against an object, and to further transmit shocks through the frame members 10 to the vehicle springs 18.

The bumper 19, clamps A, supporting members B and brackets C may be assembled in the factory and so shipped if that seems desirable. When they are thus assembled and it is desired to install the complete bumper equipment on a car, the bumper may be tried and if the brackets C fit the frame properly, they are bolted on, the nuts 16 of the spring bolts being first removed so that said spring bolts may be caused to pass through the registering apertures of the brackets and supporting members. If they do not fit, the nuts 26 of the clamping bolts may be loosened and the clamp A be adjusted lengthwise on the bumper element 19 until the proper adjustment is had, upon which the nuts 16 are again tightened.

The quick adjustability of the clamps A on the bumper facilitates easy assembling of the complete bumper structure and convenient installation on the vehicle, and adjustment for different makes of cars.

Because of the resiliency of the clamps A and the spacing of the apertured ears 22, the clamps can be readily assembled upon the bumper element even if the diameter of the latter member varies somewhat and the parts are merely sprung until there is a tight fit.

The simplicity, low cost and easy installation of this structure are obvious.

I claim as my invention:

1. In a bumper fitting, a bracket having a portion adapted to contact with one side of a longitudinal frame member and a portion extended laterally to overlap the top of and be secured to said frame member, a supporting member having a straight portion overlapping and secured to the lower end of said bracket and also having a substantially vertical S-curved portion, a resilient split ring clamp having spaced parallel ears, the S-curved portion terminating in a straight portion received between said ears, and a clamping bolt extending through said ears and through said straight terminal portion.

2. In a bumper fitting, a bracket having a portion adapted to contact with one side of a longitudinal frame member and a portion extended laterally to overlap the top of and be secured to said frame member, a supporting member having a straight portion overlapping and secured to the lower end of said bracket and also having a substantially vertical S-curved portion, a resilient split ring clamp having spaced parallel ears, the S-curved portion terminating in a straight portion received between said ears, and a clamping bolt extending through said ears and through said straight terminal portion, said straight terminal portion being inclined slightly above the horizontal.

3. In a bumper fitting, a bracket having a portion adapted to contact with one side of a longitudinal vehicle frame member and a portion extending laterally to overlap the top of and be secured to said frame member, a supporting member having an S-curve between its ends arranged substantially vertically, a clamping means at the upper end of said S-curve, the lower end portion of said S-curve being extended to overlap the lower end of said bracket, said portion and the bracket being formed with registering holes, and a bolt extended through said holes.

4. In a bumper fitting, a clamping member, a supporting member having a substantially vertical S-curve with one end attached to said clamping member, the opposite end portion of said supporting member being twisted into a vertical plane and apertured to receive the shackle bolt of a vehicle, a bracket arranged to contact one face of a vehicle frame member and overlap at its lower end the end portion of said supporting member and bolted thereto, the upper end of said bracket being extended laterally over the top of said frame member and bolted thereto.

5. In a bumper fitting, a clamping member, a supporting member having a substantially vertical S-curve with one end attached to said clamping member, the opposite end portion of said supporting member being twisted into a vertical plane and apertured to receive the shackle bolt of a vehicle, a bracket arranged to contact one face of a vehicle frame member and overlap at its lower end the end portion of said supporting member and bolted thereto, said bracket also being apertured to receive said shackle bolt, the upper end of said bracket being extended laterally over the top of said frame member and bolted thereto.

Des Moines, Iowa, July 18, 1928.

ALGOT W. NORDGREN.